Sept. 7, 1954 L. E. NORTON 2,688,701

SIGNAL FREQUENCY DIVIDER

Filed Jan. 22, 1951

INVENTOR
Lowell E. Norton
BY J. L. Whittaker
ATTORNEY

Patented Sept. 7, 1954 2,688,701

UNITED STATES PATENT OFFICE 2,688,701

SIGNAL FREQUENCY DIVIDER

Lowell E. Norton, Princeton, N. J., assignor to Radio Corporation of America, a corporation of Delaware Application January 22, 1951, Serial No. 207,187

7 Claims. (Cl. 250—36)

Figure 1A:
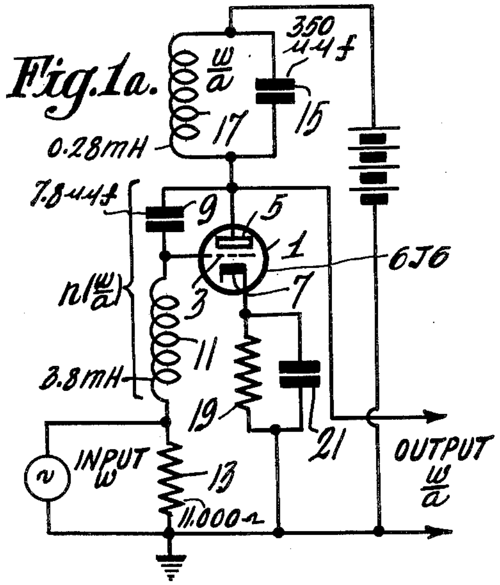

This invention relates to frequency dividing systems for deriving from one periodic wave of a first predetermined frequency another periodic wave of a second frequency which is a sub-multiple of the first frequency.

Accurate sub-multiples of an applied signal frequency are useful in time standard work, photographic and television apparatus, modulator units, and other fields.

Frequency dividing systems presently employed are not only restricted in frequency range and sometimes unstable, but are also unnecessarily complex and encumbered with much associated structure. Ordinary counter type frequency dividers have an upper frequency limit, caused by time constant limitations, of 20 to 25 megacycles. Regenerative frequency dividers using multigrid modulators cannot be used at very high frequencies because such tubes generally have high internal capacitances existing between closely associated tube electrodes. Good high frequency triodes, however, are now available which operate satisfactorily to frequencies as high as 5,000 megacycles.

An object of the invention is to improve signal frequency division.

Another object is to extend the operating frequency range of frequency dividing systems.

Another object of the invention is to provide a simplified means for dividing the frequency of an applied signal.

A further object of this invention is to provide an improved method and a simplified frequency dividing system especially adapted to operate at frequencies higher than the operating frequencies of conventional frequency dividing systems.

Any conventional amplifying means may be employed in accordance with the instant invention to provide frequency division. Vacuum tubes and crystals are typical examples of suitable amplifying devices.

In a typical embodiment of the invention, the frequency dividing circuitry may include a high frequency triode tube having cathode, anode, and control electrodes. A signal input circuit is connected between the control and cathode electrodes of the tube. An output circuit tuned to the desired sub-multiple of the applied signal frequency includes a parallel-resonant circuit connected to the anode electrode of the tube. A feedback circuit couples the output circuit to the input circuit and is serially connected with the input circuit. The series combination of the input and feedback circuits is preferably made series resonant at a selected harmonic of the output frequency.

When the circuit is in operation and the output circuit is tuned to the desired sub-multiple output signal frequency, proper adjustment of the tube bias level causes the tube output to be rich in harmonics of the output signal frequency. These harmonics are coupled by the feedback circuit from the anode circuit to the input circuit. The input circuit with the feedback circuit may be tuned selectively to a harmonic of the output signal frequency which when heterodyned in the tube with the applied signal of the frequency to be divided produces a difference frequency which maintains the output at the desired frequency.

Figure 1B:
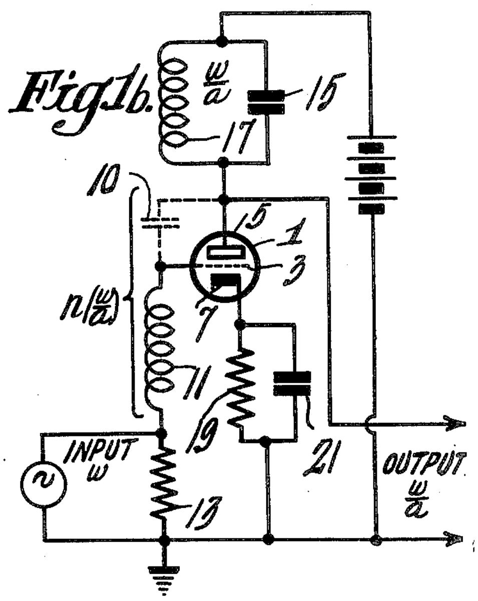
Figure 2:
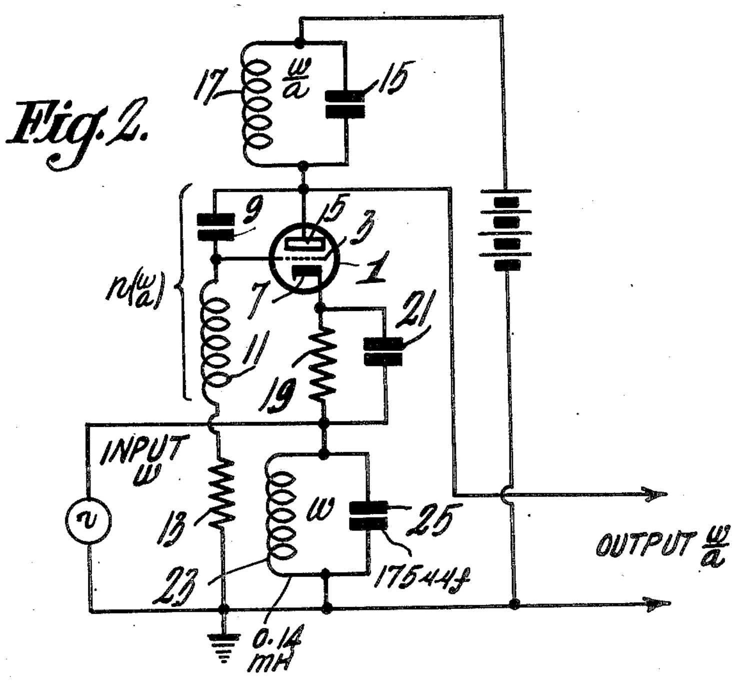

The invention, and embodiments thereof, will be described in greater detail with reference to the accompanying drawing of which:

Figure 1*a* is a schematic circuit diagram of a first embodiment of the invention employing external capacitor feedback and a tuned grid input circuit, including frequency divider component part values for an applied signal of one megacycle and a frequency division ratio of two;

Figure 1*b* is a schematic circuit diagram of a modification of the frequency divider of Figure 1*a* especially adapted to operate at very high frequencies and utilizing solely tube interelectrode capacity feedback; and Figure 2 is a schematic circuit diagram of a third embodiment of the instant invention employing a cathode input circuit and a tuned grid circuit.

Like reference characters are applied to like elements throughout the drawing.

In the first embodiment of the invention, illustrated in Figure 1*a*, the frequency dividing structure includes a high frequency triode 1 having control, anode, and cathode electrodes 3, 5, and 7 respectively. A signal input circuit includes an inductor 11 and a resistor 13 serially connected between the control electrode 3 and ground. A feedback circuit for coupling energy from the anode circuit of the triode 1 to the signal input circuit comprises a capacitor 9 connected between the control electrode 3 and the anode electrode 5. The feedback capacitor 9 is serially connected with the signal input circuit. The output circuit of the frequency divider includes a parallel-connected capacitor 15 and an inductor 17 resonant at the desired output frequency $$\frac{\omega}{a}$$

where $\omega$ is the applied signal frequency and $a$ is an integer designating the desired frequency division ratio. Cathode bias is provided for the tube by a resistor 19 shunted by a capacitor 21.

For a division ratio of two the tube may be biased to operate on a curved portion of its grid-anode characteristic curve. The anode circuit is tuned to a frequency of $$\frac{\omega}{2}$$

and is initially excited by a starting transient. Energy of frequency $$\frac{\omega}{2}$$

is coupled from the anode circuit to the input circuit by the feedback capacitor 9 which is serially connected to the inductor 11 and the resistor 13 of the input circuit. The series combination of the capacitor 9 and the inductor 11 is tuned to resonate at the desired difference frequency.

$$\frac{\omega}{a}=\frac{\omega}{2}$$

This feedback energy of frequency $$\frac{\omega}{2}$$

is mixed in the triode 1 with the applied signal frequency $\omega$ thereby generating sum and difference frequencies $$\left(\omega+\frac{\omega}{2}\right)$$

and $$\left(\omega-\frac{\omega}{2}\right)$$

respectively. The sum frequency here serves no useful purpose and is therefore discarded. The difference frequency $$\frac{\omega}{2}$$

reinforces and maintains oscillations at the desired output frequency $$\frac{\omega}{2}$$

Typical circuit component values for an applied signal of one megacycle and a frequency division ratio of two are indicated on the circuit diagram of Fig. 1*a* and Fig. 2.

The capacitor 9 in the feedback circuit and the inductor 11 in the signal input circuit may have any non-critical values so long as their reactances are properly proportioned to develop a large part of the feedback voltage across the grid to cathode circuit of the triode 1. The resistor 13 in the signal input circuit is small enough so that the Q of the circuit is high to aid selectivity, yet large enough to prevent the circuit from self-oscillating and producing an erroneous output if the input drive is removed.

The feedback capacitor 9 and the input circuit inductor 11 may be non-resonant in which case the desired output from the triode 1 is fixed by the magnitude of the feedback voltage and the conversion transconductance at the selected difference frequency $$\left(\omega-\frac{\omega}{2}\right)$$

When the capacitor 9 and the inductor 11 are series resonant at the feedback signal frequency the grid-to-cathode voltage is determined largely by the Q of the combination of the capacitor 9, the inductor 11, and the resistor 13. A high output may then be obtained at frequency $$\frac{\omega}{2}$$

with a moderate conversion transconductance at the difference frequency $$\left(\omega-\frac{\omega}{2}\right)$$

At moderately high operating frequencies, approximately 50 megacycles or higher, it may be advantageous to replace the lumped circuits with suitable sections of transmission lines.

Larger frequency division ratios than two are obtainable. For an output to be maintained at $$\frac{\omega}{a}$$

the preferable series resonant feedback and signal input circuits are tuned to a selected harmonic $$n\left(\frac{\omega}{a}\right)$$

of the output signal frequency, where $n$ is an integer and $$\frac{\omega}{a}$$

is the desired output frequency. The harmonic signal of frequency $$n\left(\frac{\omega}{a}\right)$$

beats with the applied signal of frquency $\omega$ and sustains an output at frequency $$\frac{\omega}{a}$$

If the lower sideband is used, the circuit frequency relations are then $$\left[\omega-n\left(\frac{\omega}{a}\right)\right]=\frac{\omega}{a}$$

or, $$\left(\frac{\omega}{a}\right)=\left(\frac{\omega}{n+1}\right)$$

To obtain a frequency division ratio of six, for example, the output circuit is resonated at $$\frac{\omega}{6}$$

The integer "*n*" is then equal to five. The serially connected feedback and signal input circuits are resonant at the fifth harmonic $$\left(\frac{5\omega}{6}\right)$$

of the output frequency $$\frac{\omega}{6}$$

and beat with the applied signal of frequency $\omega$ in the triode generating a difference frequency $$\left(\omega-\frac{5\omega}{6}\right)=\frac{\omega}{6}$$

which sustains the desired output. A similar equation $$\left[n\left(\frac{\omega}{a}\right)-\omega\right]=\frac{\omega}{a}$$

or, $$\left(\frac{\omega}{a}\right)=\left(\frac{\omega}{n-1}\right)$$

may be derived for tuning the serially connected feedback and input circuits to a frequency above the applied signal of frequency $\omega$. For example, for a frequency division ratio of six, the serially connected circuits may be tuned to a signal of frequency $$\frac{7\omega}{6}$$

which beats with the input signal of frequency $\omega$ producing the difference frequency $$\frac{\omega}{6}$$

as before. It is preferable, however, to tune the input circuit below the input frequency to obtain degenerative action on phase and frequency modulation of the output and therefore obtain more stable operation.

As the integer "$n$" becomes large an extremely high Q circuit may be required to selectively develop oscillations between say, 8th, 9th, 10th, or higher order harmonics. For all the conditions herein described it should be understood that it may be necessary to allow for the tube and wiring capacities in selection of the frequency divider circuit values.

The principal requirement for the larger frequency division ratios is that the tube produce the necessary harmonics of the output signal of sufficient amplitude to be applied by feedback to the input circuit to sustain oscillations at the output frequency. Proper adjustment of the bias level of the tube 1 shifts the tube's operating point to a region of its grid-anode characteristic curve of higher order curvature wherein an output is produced rich in harmonics of the desired output frequency $$\frac{\omega}{a}$$

An output rich in harmonics of the output frequency $$\frac{\omega}{a}$$

may also be obtained by selecting component part values for the series resonant feedback and input circuits such that the Q of these serially connected circuits is increased. As this Q increases, the drive between grid and cathode in the triode 1 increases and causes the tube 1 to operate over a non-linear region of its grid-anode characteristic curve thereby generating harmonics.

Figure 1*b* illustrates a modification of the invention for use at very high frequencies wherein the interelectrode capacity 10 between the grid and anode electrodes 3 and 5 performs the function of the capacitor 9 of Figure 1*a*. This interelectrode capacity 10 also feeds energy from the output circuit to the input circuit and functions as a part of the preferable series resonant input circuit. The operation of the circuit of Figure 1*b* is similar to the operation of the circuit of Figure 1*a*.

A third embodiment of the invention, shown in Figure 2, comprises developing the applied input signal of frequency $\omega$ across a parallel-connected inductor 23 and capacitor 25 in the cathode circuit of the high frequency tube 1, the combination being tuned to the applied signal frequency $\omega$. The circuit operation for this embodiment of the invention is similar to the operation herein described for Figures 1*a* and 1*b*. Energy at the desired output frequency $$\frac{\omega}{a}$$

is coupled from the output circuit to the input circuit which is tuned to a selected harmonic $$n\left(\frac{\omega}{a}\right)$$

of the desired output frequency $$\frac{\omega}{a}$$

This harmonic signal of frequency $$n\left(\frac{\omega}{a}\right)$$

heterodynes with the applied signal frequency $\omega$ and produces a difference frequency which, by the aid of the feedback capacitor 9, maintains an output at $$\frac{\omega}{a}$$

Thus the instant invention discloses a frequency divider capable of operation at high frequencies. The frequency divider of the invention affords flexibility in obtainable frequency division ratios. While a plurality of amplifying means may be connected in parallel for increased power output at the desired sub-multiple frequency, the circuit of the present invention is so simple that a single amplifying means, for example a vacuum tube, may be used to advantage.

I claim:

1. A system for obtaining a desired sub-multiple frequency signal output from an input signal of given frequency comprising a non-linear amplifying means having cathode, anode, and control electrodes, an output circuit connected to said anode electrode, said output circuit being tuned to said desired sub-multiple frequency, a signal input circuit connected between said control and cathode electrodes to receive said input signal, a feedback circuit connected between said anode and control electrodes, said feedback and input circuits being connected and tuned to a selected harmonic of said desired sub-multiple frequency, whereby a selected harmonic of said desired sub-multiple output signal frequency is fed back from said output circuit to said input circuit and beats with said input signal thereby generating a modulation frequency equal to and sustaining said output signal frequency.

2. A system as described in claim 1 wherein said signal input circuit includes a circuit parallel resonant at said input signal frequency.

3. A system as described in claim 1 wherein said input circuit includes a resistor having a value selected to prevent said system from self-oscillating when drive at said given input signal frequency is removed.

4. A system as described in claim 1 wherein said feedback circuit includes a capacitor distinct from the interelectrode capacity of said tube.

5. A system as described in claim 1 wherein said feedback circuit comprises substantially solely the capacity existing between said control and said anode electrodes.

6. A system for obtaining a desired sub-multiple frequency signal output from a given frequency input signal, comprising an electron discharge tube having anode, grid and cathode electrodes, a parallel resonant output circuit connected to said anode, said circuit being resonant at said desired sub-multiple frequency, a capacitor connected between said anode and grid, an inductor having one end connected to said grid, said capacitor and inductor having their values selected to be resonant at a selected harmonic of said sub-multiple frequency, a resistor having one end connected to the other end of said inductor, said resistor having a value selected to prevent oscillation of said tube in the absence of the application of said given frequency input signal to said system, and means coupling said cathode to the other end of said resistor.

7. The system recited in claim 6 wherein said means coupling said cathode to the other end of said resistor includes a parallel resonant circuit said circuit being resonant at said given frequency, said circuit serving as the input circuit for said system.

References Cited in the file of this patent

UNITED STATES PATENTS

| Number | Name | Date |
|---|---|---|
| 1,936,789 | Harmon | Nov. 28, 1933 |
| 2,159,595 | Miller | May 23, 1939 |
| 2,496,994 | Goldberg | Feb. 7, 1950 |